(12) United States Patent
Wolf et al.

(10) Patent No.: US 11,962,109 B2
(45) Date of Patent: Apr. 16, 2024

(54) MODULE CONNECTOR

(71) Applicant: TE Connectivity Germany GmbH, Bensheim (DE)

(72) Inventors: Marcus Wolf, Bensheim (DE); Patrick Distler, Bensheim (DE); Frank Kaehny, Woert (DE); Chris Buechling, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 17 days.

(21) Appl. No.: 17/361,599

(22) Filed: Jun. 29, 2021

(65) Prior Publication Data

US 2021/0408721 A1 Dec. 30, 2021

(30) Foreign Application Priority Data

Jun. 30, 2020 (DE) ...................... 10 2020 208 149.2

(51) Int. Cl.
*H01R 13/504* (2006.01)
*H01R 13/40* (2006.01)
(Continued)

(52) U.S. Cl.
CPC ......... *H01R 13/5045* (2013.01); *H01R 13/40* (2013.01); *H01R 13/44* (2013.01);
(Continued)

(58) Field of Classification Search
CPC .. H01R 13/5045; H01R 13/40; H01R 13/629; H01R 24/38; H01R 4/10; H01R 4/30;
(Continued)

(56) References Cited

U.S. PATENT DOCUMENTS 3,747,048 A * 7/1973 Johnson ................ H01R 13/53
439/276
6,386,911 B1 * 5/2002 Biermann .......... H01R 12/7064
439/571

(Continued)

FOREIGN PATENT DOCUMENTS

DE 102006031161 A1 1/2008

OTHER PUBLICATIONS

Communication—Extended European Search Report in EP Appln. No. 21181994.1-1201, dated Nov. 11, 2021, 10 pp.

(Continued)

*Primary Examiner* — Travis S Chambers
(74) *Attorney, Agent, or Firm* — Barley Snyder

(57) ABSTRACT

A module connector includes a first connection part and a second connection part that can be electrically conductively connected with the first connection part. The first connection part has a first attachment element and the second connection part has a second attachment element; the first attachment element can be inserted into the second attachment element. Each of the first connection part and the second connection part has a contact protection at a side facing the other connection part. The contact protection has an outer electrically insulating collar and an electrically insulating protection pin surrounded by the outer electrically insulating collar. At least one of the first connection part and the second connection part has a current bridge between the outer electrically insulating collar and the electrically insulating protection pin. The outer electrically insulating collar and the electrically insulating protection pin extend beyond the current bridge.

15 Claims, 9 Drawing Sheets

(51) Int. Cl.
*H01R 13/44* (2006.01)
*H01R 13/52* (2006.01)
*H01R 13/629* (2006.01)
*H01R 24/38* (2011.01)

(52) U.S. Cl.
CPC ........... *H01R 13/52* (2013.01); *H01R 13/629* (2013.01); *H01R 24/38* (2013.01)

(58) Field of Classification Search
CPC ........ H01R 13/44; H01R 13/52; H01R 11/26; H01R 4/34
See application file for complete search history.

(56) References Cited

U.S. PATENT DOCUMENTS

| | | |
|---|---|---|
| 10,381,752 B2 * | 8/2019 | Kaehny .................. H01R 11/11 |
| 2012/0164883 A1 | 6/2012 | Mazinegue-Desailly et al. |
| 2018/0287270 A1 * | 10/2018 | Blumenschein ... H01R 43/0235 |
| 2018/0375227 A1 | 12/2018 | Kaehny et al. |

OTHER PUBLICATIONS

Examination Report dated Dec. 22, 2023, corresponding to Application No. 21 181 994.1-1201, 7 pages.

* cited by examiner

MODULE CONNECTOR

CROSS-REFERENCE TO RELATED APPLICATIONS

This application claims the benefit of the filing date under 35 U.S.C. § 119(a)-(d) of German Patent Application No. 102020208149.2, filed on Jun. 30, 2020.

FIELD OF THE INVENTION

The present invention relates to a connector and, more particularly, to a module connector.

BACKGROUND

In order to avoid endangering users during connection, touch protection devices are often provided. Module connectors are known, for example, with two electrically conductively interconnectable connection parts comprising a mutually compatible attachment element for attaching the connection parts to one another. Each connection part at its connection side facing the other connection part is provided with a contact protection comprising an outer, electrically insulating collar and an electrically insulating protection pin that is surrounded by the collar. At least one connection part between the collar and the protection pin, a current bridge is located that the collar and the protection pin extend beyond. Module connectors, however, commonly require a lot of installation space.

SUMMARY

A module connector includes a first connection part and a second connection part that can be electrically conductively connected with the first connection part. The first connection part has a first attachment element and the second connection part has a second attachment element; the first attachment element can be inserted into the second attachment element. Each of the first connection part and the second connection part has a contact protection at a side facing the other connection part. The contact protection has an outer electrically insulating collar and an electrically insulating protection pin surrounded by the outer electrically insulating collar. At least one of the first connection part and the second connection part has a current bridge between the outer electrically insulating collar and the electrically insulating protection pin. The outer electrically insulating collar and the electrically insulating protection pin extend beyond the current bridge.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
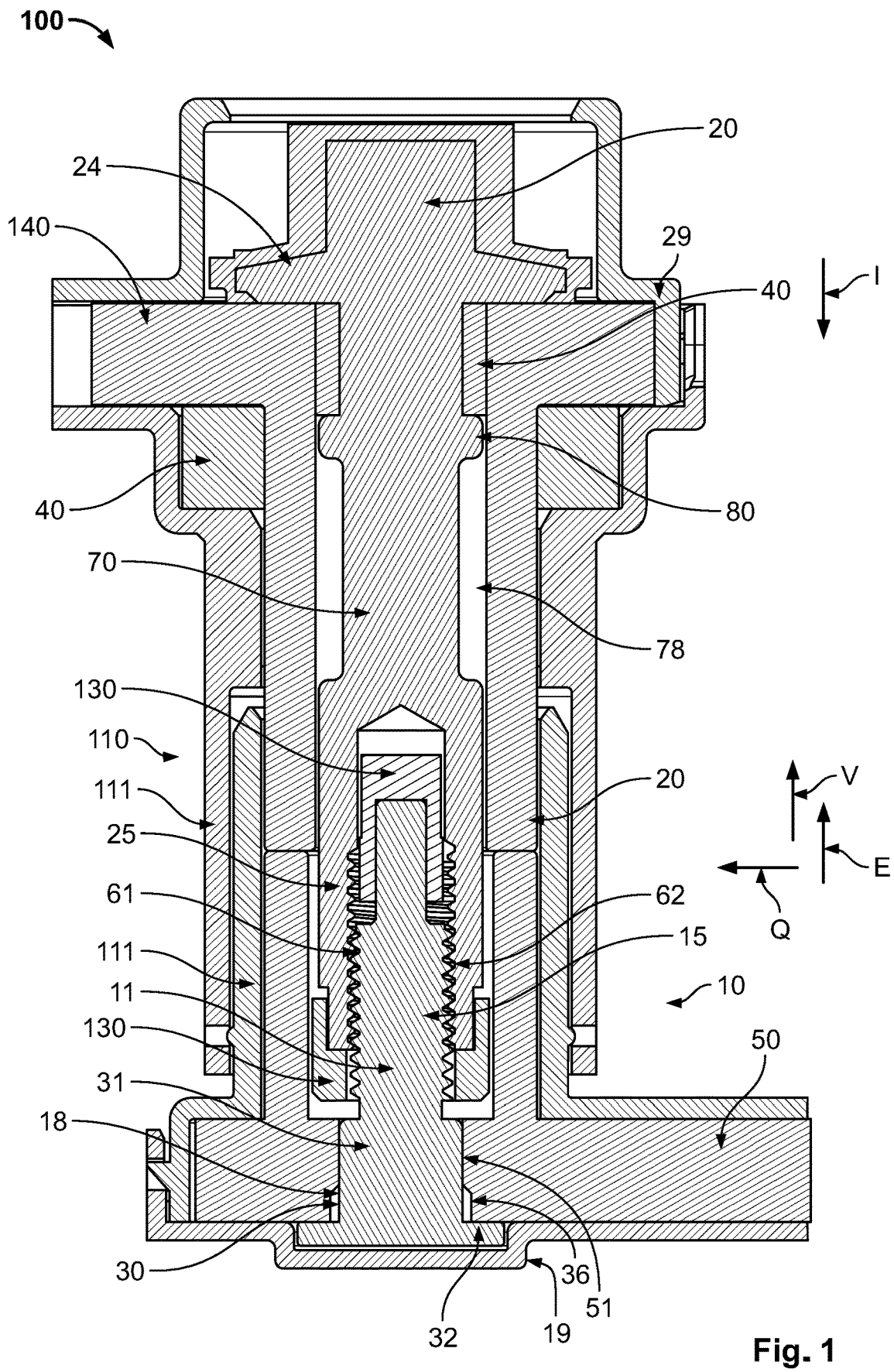
FIG. 1 is a sectional side view of a module connector according to a first embodiment.

In the following, the invention is explained in more detail by way of embodiments with reference to the drawings. The embodiments and configurations shown are in each case independent of one another and can be combined with one another as desired, depending on particular applications.

Various embodiments of module connectors 100 are shown in FIGS. 1-9, where like reference numbers refer to like elements. Such a module connector 100 according to the embodiments described herein can be used, for example, when connecting batteries or battery cells in electric vehicles.

The module connectors 100 according to the embodiments shown in FIGS. 1-9 each have a first, lower connection part 10 with a first, lower attachment element 11 and a second, upper connection part 20 with a second, upper attachment element 21. In each case, the lower attachment element 11 can be inserted into the upper attachment element 21 and comprises a connection geometry 18 in the form of a press-fit section 30 for attachment to a current bar 50. The connection geometry 18 and the press-fit section 30 can transmit force and momentum to the current bar 50, for example torque, by a frictional connection. The connection geometry 18, in particular the press-fit section 30, can be fastened to the current bar 50 by a cold pressing process. The first connection part 10 can be electrically conductively connected with the second connection part 20.

Due to the fact that the connection geometry 18 is fastened to the lower attachment element 10, the overall construction can be more compact, since a receptacle 51 in the form of a hole in the current bar 50 can have a smaller configuration than it would if the upper attachment element 21 was able to be inserted into the lower attachment element 11. The current bar 50 can consequently also be smaller, since a correspondingly smaller hole is required for the connection geometry 18.

Each of the connection parts 10, 20 has a contact protection 110 that prevents a user from touching electrically conductive parts with a finger. For a standardized definition of a touch protection, defined test fingers can be used, for example, with which it is not possible to touch electrically conductive parts.

The contact protection 110 has in each case an outer, electrically insulating collar 111, which surrounds a protection pin 112. A current bridge 120 is provided on each connection part 10, 20 between the collar 111 and the protection pin 112 to establish an electrical connection. In the assembled state, the two current bridges 120, which are made of a material with good electrical conductivity, such as copper, are in contact with one another. In this regard, the current bridges 120 may be in one piece with the electrically conductive elements to be used, such as the current bar 50. In other configurations, the current bridges 120 may be separate elements.

The collars 111 are made of an electrically insulating material and may, for example, be in one piece with further insulating elements 19, 29 shown in FIG. 1, which provide insulation around the connection parts 10, 20. The protection pins 112 are each seen or provided at their front or tip with an insulating cap 130, which is also made of an insulating material and provides contact protection. The collars 111 and the protection pins 112 each tower, or protrude beyond, the current bridges 120.

Figure 2:
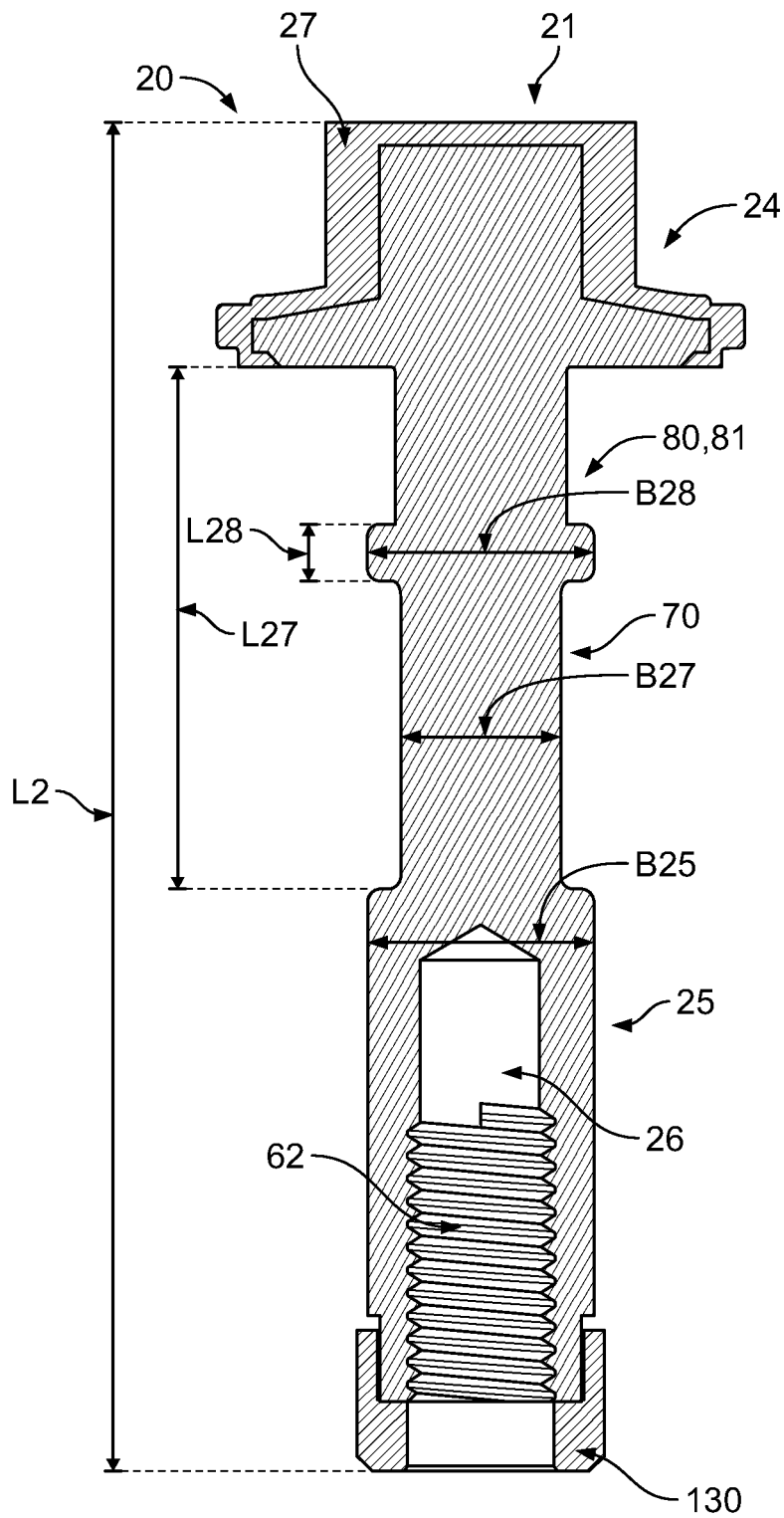
FIG. 2 is a sectional side view of an attachment element of the module connector of FIG. 1.

In order to fasten the two connection parts 10, 20 to one another, attachment elements 11, 21 made of mechanically stable material, for example steel, are provided, as shown for example in FIGS. 1 and 2. These in turn each have an attachment section 25, wherein the attachment sections 25 interact in the assembled state and fasten the two connection parts 10, 20 to one another.

Figure 3:
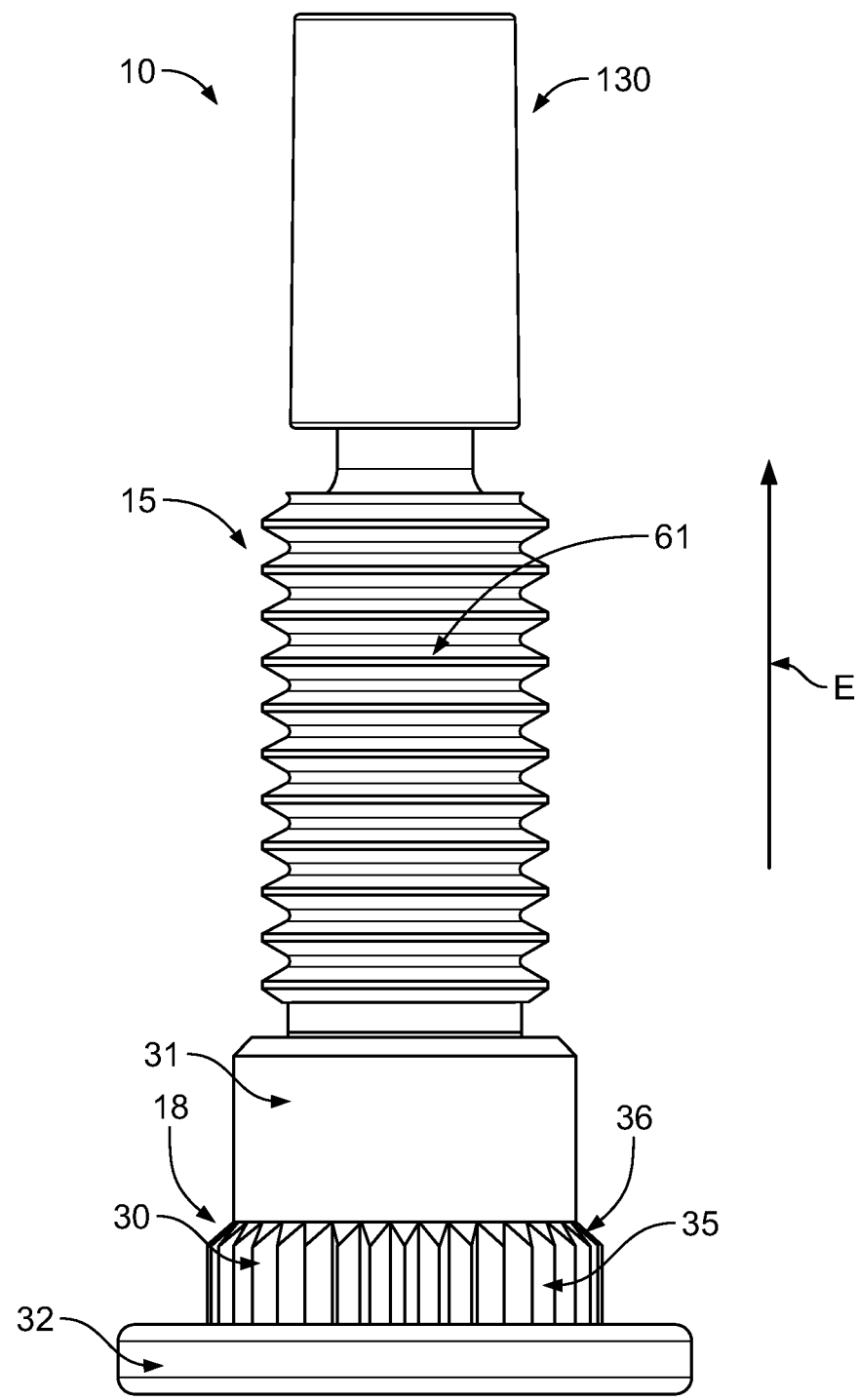
FIG. 3 is a side view of a further attachment element of the module connector of FIG. 1.

The first, lower attachment element 11 has an external thread 61, as shown in FIG. 3, which can be screwed to an internal thread 62 of the second, upper attachment element 12, shown in FIGS. 1 and 2. The second attachment element 11 has a receptacle 26 into which the attachment section 25 of the lower attachment element 11 can be inserted and in which the internal thread 62 is located. This allows the installation space to be kept small, wherein at the same time a secure attachment is possible.

The upper attachment element 21 has an actuation section 24 shown in FIGS. 1, 2, 6, 8, and 9 at which the attachment element 21 can be actuated, for example, manually or with a machine. The actuation section 24 can be configured as a head 23, in particular as a screw head. The actuation section 24 may have an insulating element 27 made of an electrically insulating material on the outside to prevent electrical contact. The actuation section 24 may, for example, comprise a profile to allow rotation, such as for a screwing movement. The head 23 may further comprise a widened flange.

Figure 7:
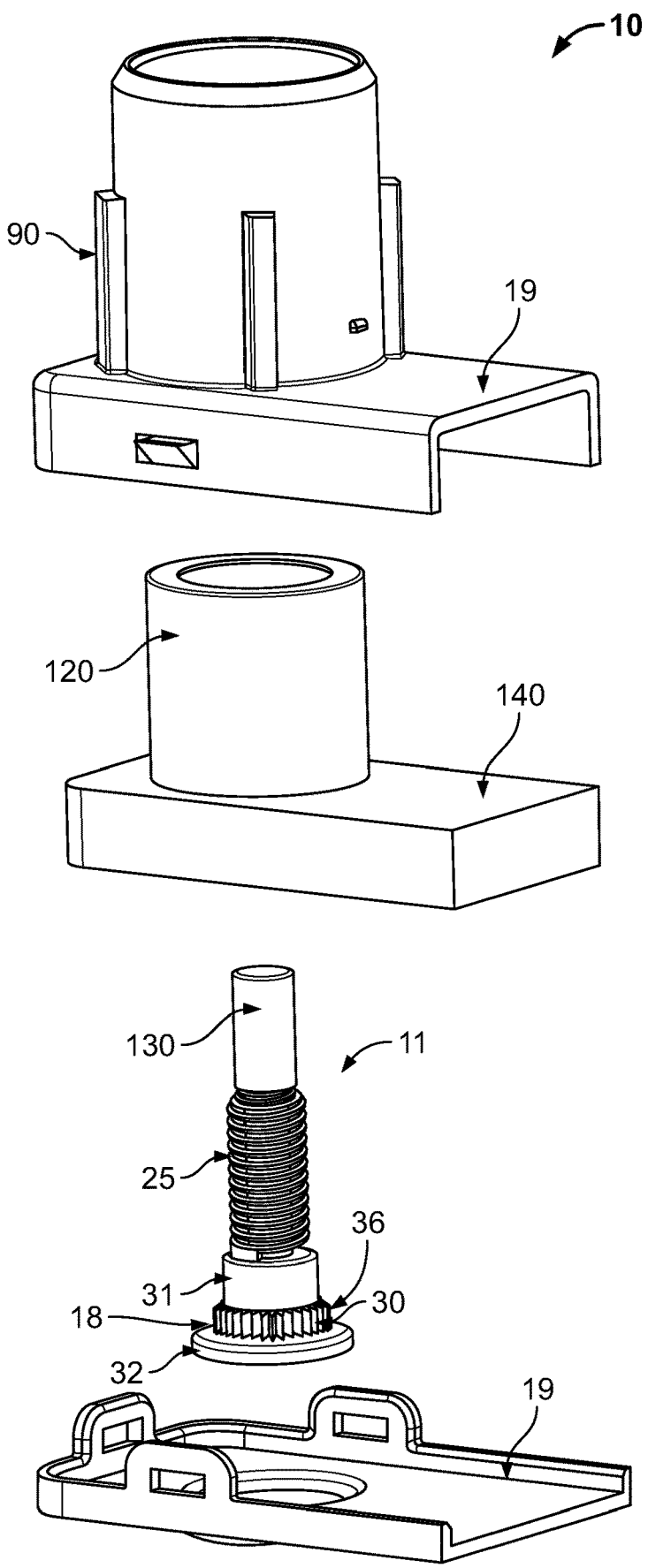
FIG. 7 is an exploded perspective view of a lower connection part of the module connector according to the second embodiment.
Figure 8:
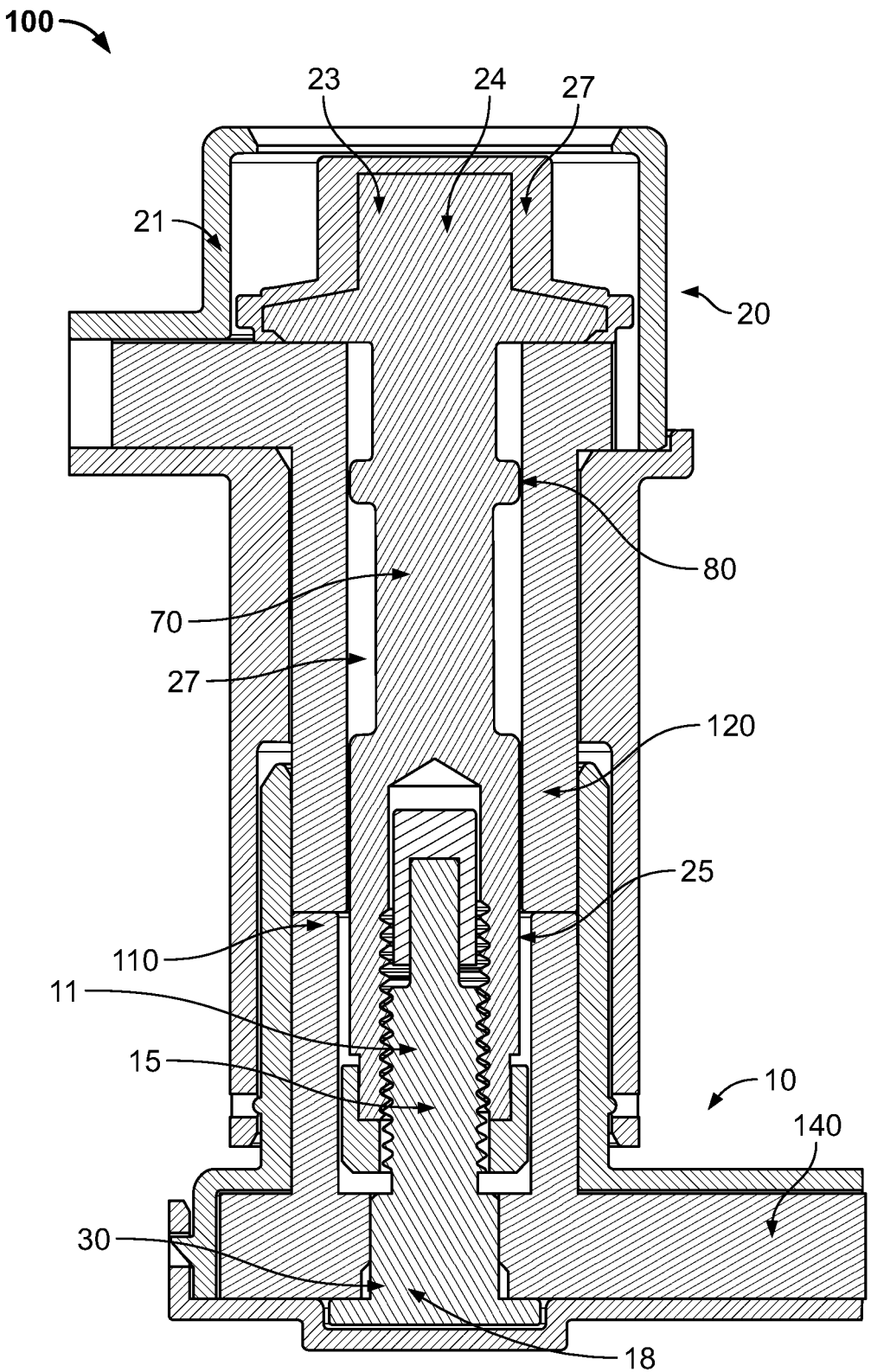
FIG. 8 is a sectional side view of the module connector according to the second embodiment.
Figure 9:
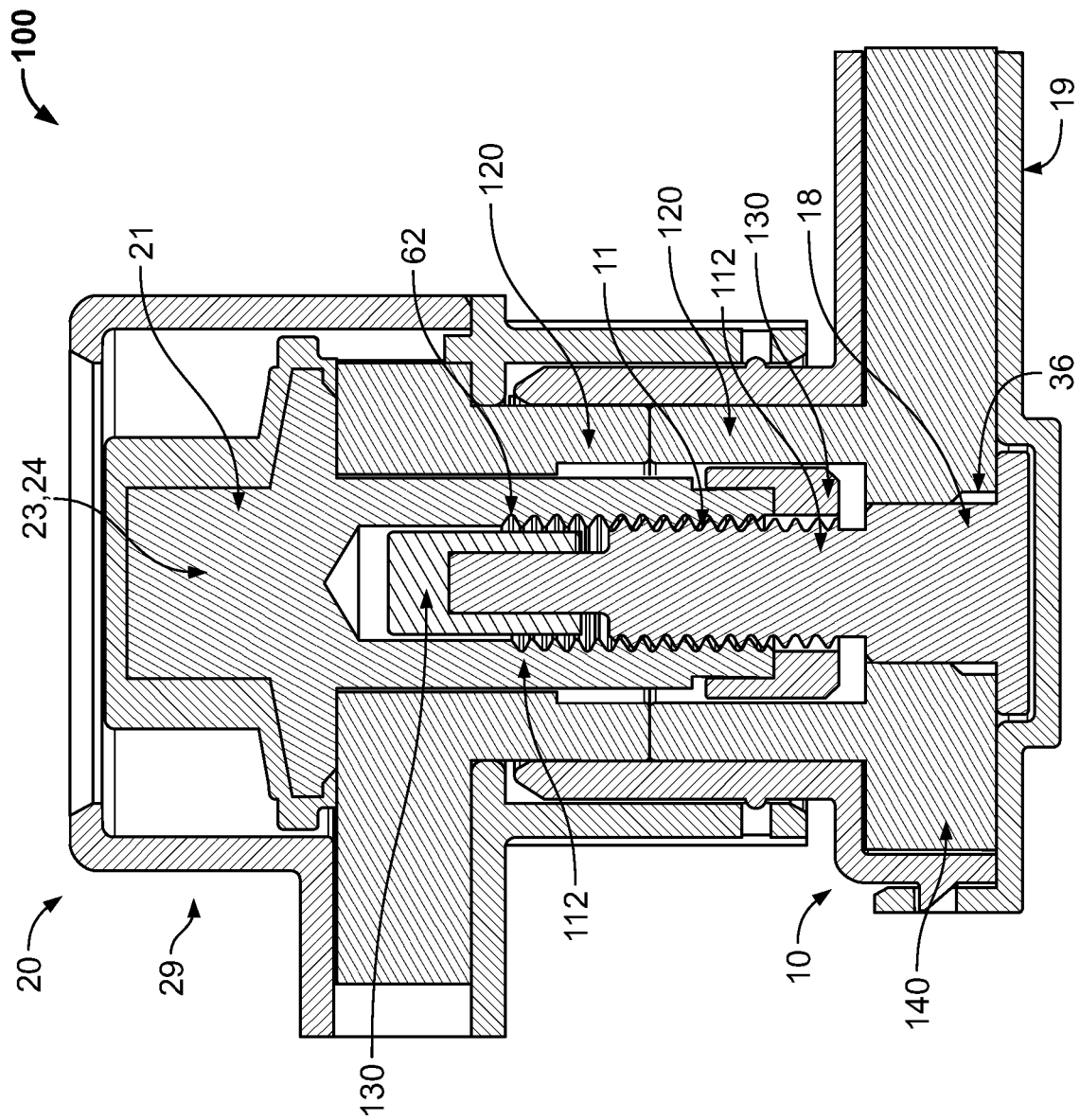
FIG. 9 is a sectional side view of a module connector according to a third embodiment.

The connection geometry 18 in the form of the press-fit section 30 is followed along the insertion direction E by a base section 31, shown in FIGS. 1, 3, and 7, which does not necessarily have to achieve a clamping effect or a pressing effect, however, it can be adapted to an inner contour of the receptacle 51 in the current bar 50. The base section 31 is between the connection geometry 18 and the attachment section 25. Furthermore, a stop section 32, which may be configured as a head, is provided behind the press-fit section 30. The stop section 32 prevents further insertion of the attachment element 11 into the current bar 50, limiting movement of the attachment element 11 in an inserted state. An outer contour of the base section 31 may correspond to the inner contour of the receptacle 51 in the current bar 50 or be slightly smaller. A width may correspond to an inner diameter of the receptacle 51. An outer contour of the connection geometry 18 can be configured such that it generates a good clamping effect with an inner contour of a receptacle 51 in the current bar 50. For this purpose, in the non-connected state, the outer contour can be slightly larger than the inner contour.

A number of press-fit elements 35 are provided on the press-fit section 30, which in the example shown in FIG. 3 have a constant cross-section along the insertion direction E. The press-fit elements 35 are designed as radially projecting strips projecting perpendicularly to the insertion direction E and running parallel to the insertion direction E. In an embodiment, the press-fit elements 35 have a uniform cross-section to facilitate insertion. The press-fit elements 35 also serve as toothing elements 36, which help to prevent rotation of the lower attachment element 11 in the current bar 50. The toothing elements 36 can simultaneously function as press-fit elements 35 and generate a frictional connection to increase the holding effect.

The first embodiment and the second embodiment of the modular connector 100, shown in FIGS. 1-8, each have an extension section 70 at the upper attachment element 21. The extension section 70 serves for height compensation along a connection direction V along which the lower connection part 10 is connected to the upper connection part 20. If such an extension section 70 was not provided, for example, the current bar 50 or an upper conductor 140 would have to be bent, which would increase the space requirement in a transverse direction Q running transversely to the connection direction V. An extension section 70 may be present irrespective of whether an attachment geometry 18 is present and, where applicable, where the attachment geometry 18 is located. In an additional or alternative configuration, the extension section 70 may be provided on the one connection part.

In the embodiments shown in FIGS. 1-9, the connection direction V runs parallel to an insertion direction E along which the lower attachment element 11 is inserted through the current bar 50. A plug-in direction I, along which the upper attachment element 21 is plugged into further elements of the upper connection part 20, runs in the embodiment opposite to the insertion direction E and opposite to the connection direction V.

In the area of the extension section 70, the attachment element 21 is configured narrower than in the area of the attachment section 25 and in the area of the actuation section 24. As shown in FIG. 2, a width B27 of the extension section 70 measured along the transverse direction Q is smaller than a width B25 of the attachment section 25. The extension section 70 may space apart the attachment section 25 from the actuation section 24.

The extension section 70 can have a smaller cross-section compared to an attachment section 25 into which the one attachment element 10 can be inserted. This may facilitate handling. The smaller cross-section may at least be present over the major portion of the extension section 70.

The extension section 70 can have a smaller cross-section compared to the actuation section 24. This can increase safety. For example, the actuation section 24 can then serve as a stop during an insertion process. The smaller cross-section may at least be present over the major portion of the extension section 70.

A receptacle 78 is provided between the extension section 70 and further existing elements in the assembled state, as shown in FIG. 1. The extension section 70 is spaced apart from the further existing elements in the assembled state. In an inserted state, the extension section 70 can be spaced apart from the surrounding receptacle 78. This can be advantageous, since different parts can expand to different degrees when heated. Since the extension section 70 does not directly abut the further elements, at least over the major portion of the extension section 70, the surface pressure is low. If different materials are used, they may expand to different degrees. Due to the spacing, expansion is possible without leading to excessive surface pressures and/or damage. In particular, such spacing may be present along the entire circumference to allow for uniform expansion.

In order to ensure such spacing, a spacer 80 may be provided on the extension section 70 as shown in FIGS. 1, 2, 6, and 8. The spacer 80 can project radially or laterally, for example in a radial direction or a transverse direction Q. In an embodiment, the spacer 80 is configured in one piece or integrally with the remainder of the extension section 70.

The spacer 80 can be configured, for example, as a circumferential collar 81 or as a bead. The spacer 80 can be closed along the entire circumference, thus along 360 degrees. The spacer 80 can also be configured differently, for example, as an element not completely running around the entire circumference. Four projections offset by 90 degrees can be given merely by way of example.

A width B28 of the extension section 70 at the location of the spacer 80, as shown in FIG. 2, which may be a diameter in the case of an annularly circumferential collar 81, is greater than the width B27 at the other locations of the extension section 70. In the example shown, the width B28 corresponds to the width B25 of the attachment section 25. This allows use with a channel having a consistent cross-section at the lower attachment element 11. However, the width B28 at the location of the spacer 80 may be different in other configurations, slightly larger or smaller than the width B25 of the attachment section 25.

In the first embodiment of the module connector 100 shown in FIGS. 1-5, two sealing elements 40 are further provided, which protect an interior space against the entry of liquids or dust. The sealing elements 40 are for example made of an elastic material to achieve a good sealing effect. In an embodiment, one of the sealing elements 40 is arranged between the spacer 80 and the head 23 and is held by these along the connecting direction V. A further sealing element 40 is provided between an insulating element 29 and the conductor 140, as shown in FIG. 1. The sealing elements 40 can also prevent slipping.

The extension section 70 can be shorter or longer depending on the desired height offset. In the third embodiment according to FIG. 9, no extension section 70 is provided to enable the most compact configuration possible along the connection direction V.

In the first two embodiments shown in FIGS. 1-8, when the attachment element 11 is inserted, the extension section 70 extends between the inserted attachment element 21 and the head 23, namely between the attachment section 15 of the lower attachment element 21 and the head 23 of the upper attachment element 23. The extension section 70 may extend below the head 23 to be as space-saving as possible. Furthermore, when the attachment element 11 is inserted, the extension section 70 extends between the attachment section 25 of the upper attachment element 21 and the head 23.

The spacer 80 is closer to the head 23 than to the attachment section 25. This allows the spacer 80 to provide a guiding effect that minimizes tolerances in the area of the attachment sections 15, 25.

Alternatively or additionally to the embodiments shown, an extension section 70 may also be provided on the lower attachment element 11.

The extension section 70, as shown in FIG. 3, has a length L27 that is greater than 10 percent, greater than 20 percent, greater than 30 percent, or greater than 50 percent of the total length L2 of the upper attachment element 21. In this context, the lengths may be measured along the connection direction V. The extension section 70 can be configured to be threadless.

The length L28 of the spacer 80, shown in FIG. 2, in various embodiments is less than 20 percent, or less than 10 percent, of the total length L2 of the upper attachment element 21. Furthermore, the length L28 of the spacer may be less than 20 percent, or less than 10 percent, of the length L27 of the actuation section 24. As a result, the surface pressure and material consumption can be kept low.

The extension section 70 may comprise a solid cross-section in an embodiment. This allows a compact configuration with good stability. Solid can mean in particular that material is consistently present. Cavities, receptacles or similar empty spaces are not supposed to be present.

The connection geometry 18, in this case the press-fit section 30, can comprise a solid cross-section. In particular, there may be no cavities or internal threads in the area of the connection geometry 18. This allows the design to be kept compact and stable.

Figure 4:
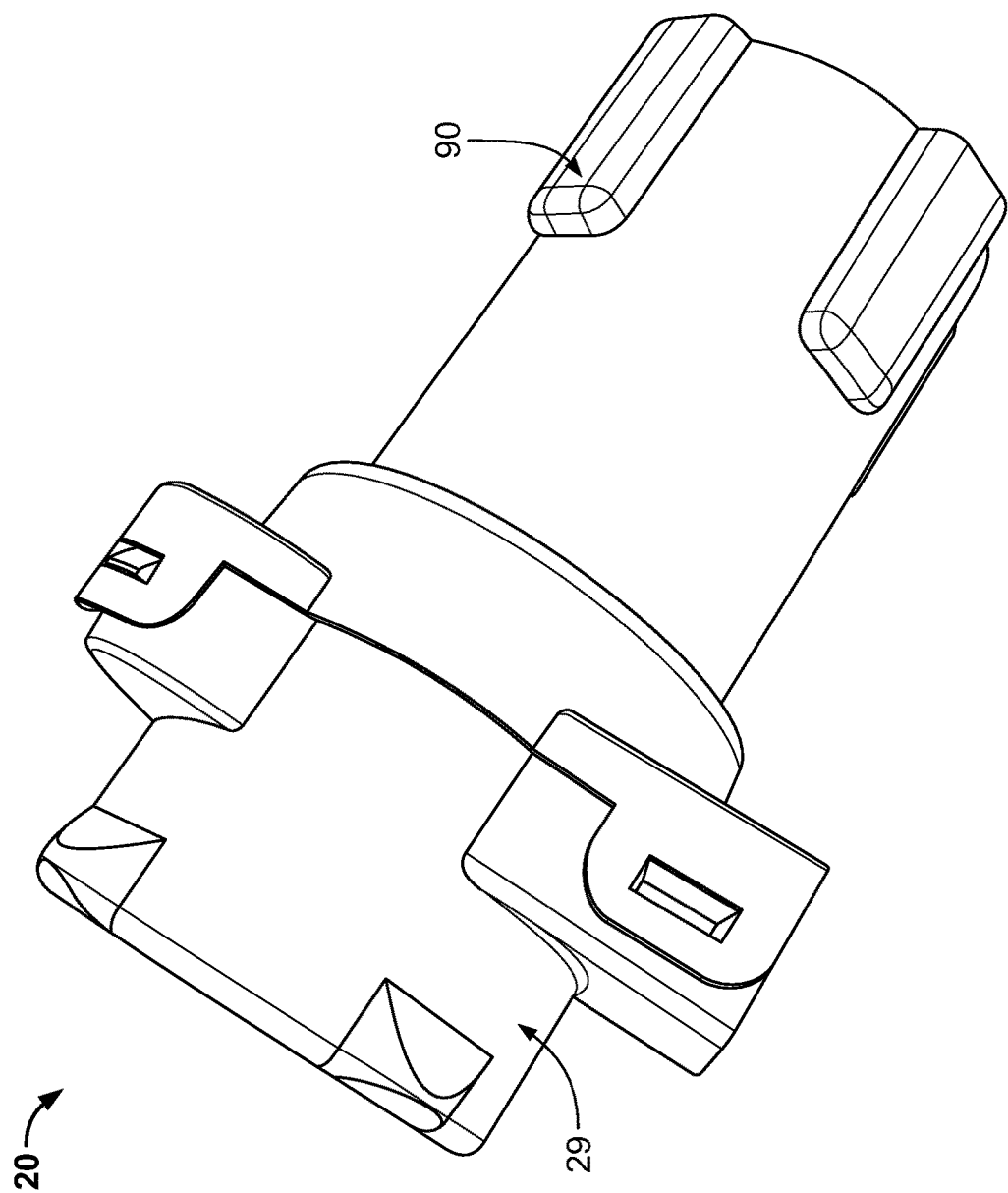
FIG. 4 is a perspective view of an upper connection part of the module connector of FIG. 1.
Figure 5:
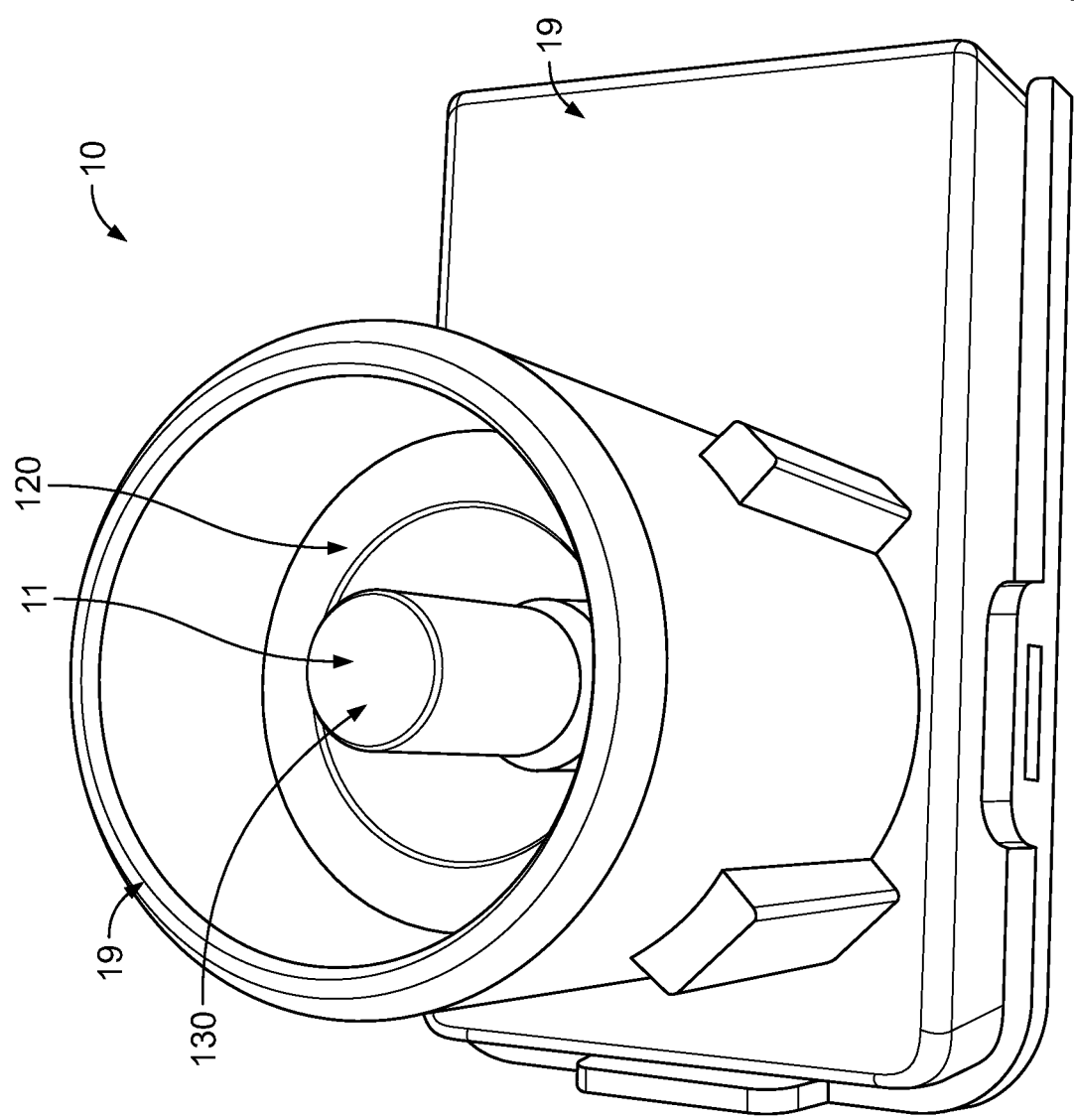
FIG. 5 is a perspective view of a lower connection part of the module connector of FIG. 1.
Figure 6:
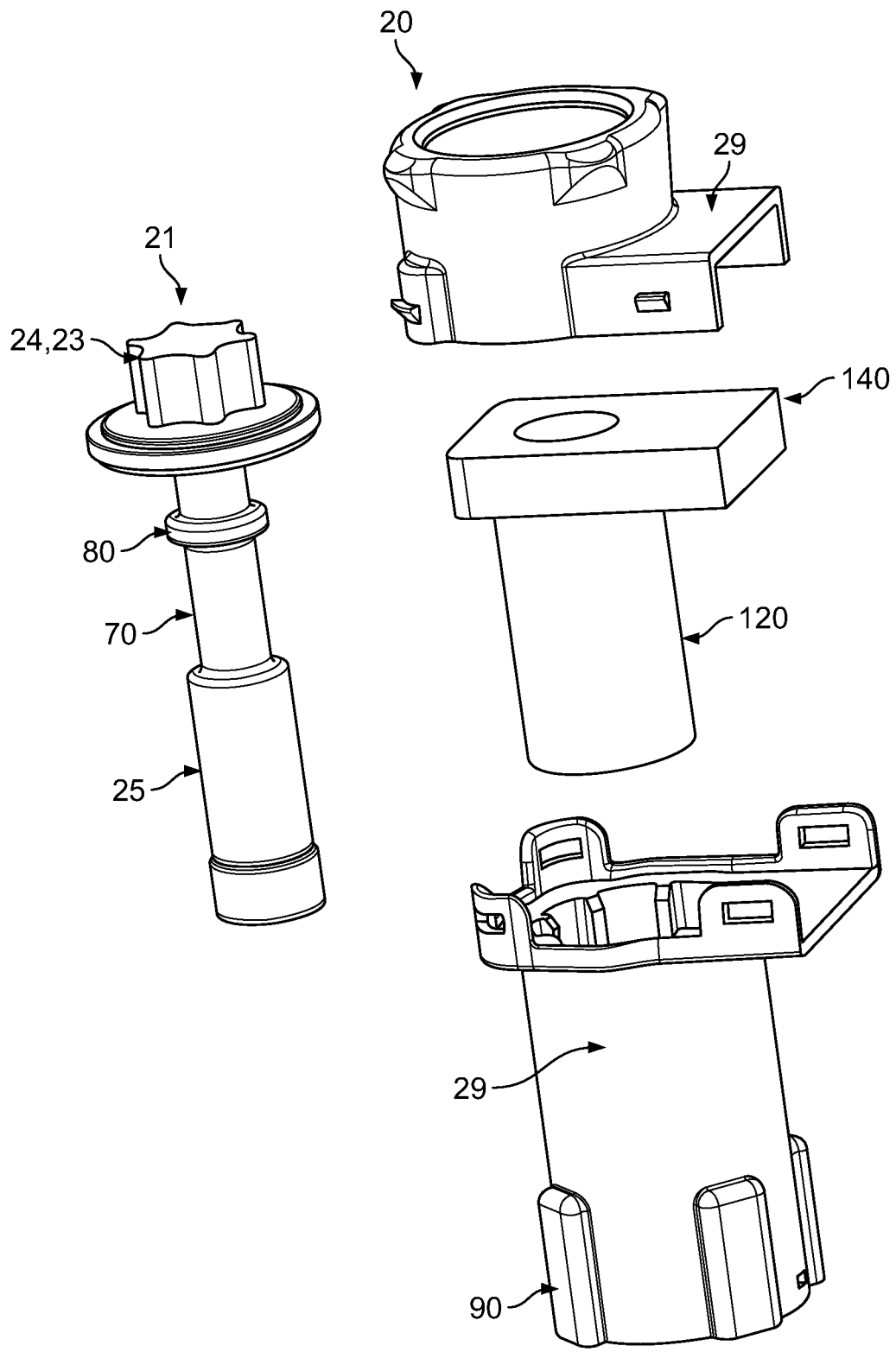
FIG. 6 is an exploded perspective view of an upper connection part of a module connector according to a second embodiment.

In order to allow the connection parts 10, 20 to be fastened to one another only in certain angular positions, coding elements 90 may be provided, as shown in FIGS. 4, 6, and 7.

The solution according to the invention aims to enables adaptation to different height offsets. This can be achieved, for example, by using extension sections 70 of different lengths or attachment elements 11, 21 of different lengths. In a corresponding set with two connection parts 20, the connection parts 20 can comprise attachment elements 21 of different lengths. In one of the connection parts 20, for example, there can be no extension section 70. Such a set may include, in addition to two different second connection parts 20, a first connection part 10 which can be connected to both second connection parts 20.

What is claimed is:

1. A module connector, comprising:
 a first connection part having a first attachment element, the first attachment element has a connection geometry for transferring force and momentum into a current bar; and
 a second connection part that can be electrically conductively connected with the first connection part, the second connection part having a second attachment element compatible with the first attachment element, the first attachment element can be inserted into the second attachment element, each of the first connection part and the second connection part has a contact protection at a side facing the other of the first connection part and the second connection part, the contact protection has an outer electrically insulating collar and an electrically insulating protection pin surrounded by the outer electrically insulating collar, at least one of the first connection part and the second connection part has a current bridge between the outer electrically insulating collar and the electrically insulating protection pin, the outer electrically insulating collar and the electrically insulating protection pin extend beyond the current bridge, the second attachment element has an extension section that, when the first attachment element is inserted into the second attachment element, extends between the first attachment element and a head of the second attachment element, the extension section has a smaller cross-section than an attachment section of the second attachment element into which the first attachment element is inserted.

2. The module connector of claim 1, wherein the first attachment element has an external thread and/or the second attachment element has an internal thread.

3. The module connector of claim 1, wherein the extension section has a solid cross-section.

4. The module connector of claim 1, wherein the connection geometry has a solid cross-section.

5. The module connector of claim 1, further comprising a sealing element disposed between a conductor and a housing part of the second connection part.

6. The module connector of claim 1, further comprising a sealing element disposed between the second attachment element and a conductor of the second connection part.

7. The module connector of claim 1, wherein the extension section has a radially projecting spacer.

8. The module connector of claim 7, wherein an outer width or diameter of the extension section at the radially projecting spacer corresponds to a width of the attachment section.

9. The module connector of claim 7, wherein the radially projecting spacer is located closer to an actuation section of the second attachment element than to the attachment section.

10. The module connector of claim 7, wherein the radially projecting spacer is formed in one piece with the extension section.

11. The module connector of claim 7, wherein the radially projecting spacer is configured as a circumferential collar.

12. The module connector of claim 1, wherein the connection geometry is configured as a press-fit section for pressing into the current bar.

13. The module connector of claim 12, wherein the press-fit section has a plurality of press-fit elements projecting perpendicularly to an insertion direction.

14. A set, comprising:
a pair of connection parts having a pair of attachment elements of different lengths, one of the pair of attachment elements has an extension section, the extension section has a smaller cross-section than an attachment section of the one of the pair of attachment elements; and
a further connection part different from each of the pair of connection parts that can be connected to each of the pair of connection parts.

15. A module connector, comprising:
a first connection part having a first attachment element, the first attachment element has a connection geometry for transferring force and momentum into a current bar; and
a second connection part that can be electrically conductively connected with the first connection part, the second connection part having a second attachment element compatible with the first attachment element, the first attachment element can be inserted into the second attachment element, each of the first connection part and the second connection part has a contact protection at a side facing the other of the first connection part and the second connection part, the contact protection has an outer electrically insulating collar and an electrically insulating protection pin surrounded by the outer electrically insulating collar, at least one of the first connection part and the second connection part has a current bridge between the outer electrically insulating collar and the electrically insulating protection pin, the outer electrically insulating collar and the electrically insulating protection pin extend beyond the current bridge, the second attachment element has an extension section that, when the first attachment element is inserted into the second attachment element, extends between the first attachment element and a head of the second attachment element, the extension section has a solid cross-section.

* * * * *